United States Patent

[11] 3,581,120

[72] Inventor Hans H. Nord
Little Falls, N.J.
[21] Appl. No. 709,033
[22] Filed Feb. 28, 1968
[45] Patented May 25, 1971
[73] Assignee The Western Union Telegraph Company
New York, N.Y.

[54] SCHMITT TRIGGER CIRCUIT WITH VARIABLE HYSTERESIS AND INSENSITIVITY TO TEMPERATURE CHANGE

3 Claims, 2 Drawing Figs.

[52] U.S. Cl. .......... 307/290, 307/255, 307/288, 307/313
[51] Int. Cl. .......... H03k 3/15, H03k 3/295
[50] Field of Search .......... 307/290, 291, 313, 255, 288

[56] References Cited

UNITED STATES PATENTS

| | | | |
|---|---|---|---|
| 2,916,636 | 12/1959 | Wanloss .......... | 307/288 |
| 3,134,032 | 5/1964 | Mann .......... | 307/290 |
| 3,077,545 | 2/1963 | Rywak .......... | 307/255 |

*Primary Examiner*—Donald D. Forrer
*Assistant Examiner*—L. N. Anagnos
*Attorney*—Michael I. Borsella

ABSTRACT: A Schmitt trigger circuit is disclosed which employs a complementary pair of transistors in a direct coupled configuration with regenerative feedback. The circuit provides means for controlling hysteresis and is substantially insensitive to temperature changes of its transistors. The circuit employs a single variable resistor in a common emitter circuit to provide symmetrical change in hysteresis.

Figure 1:
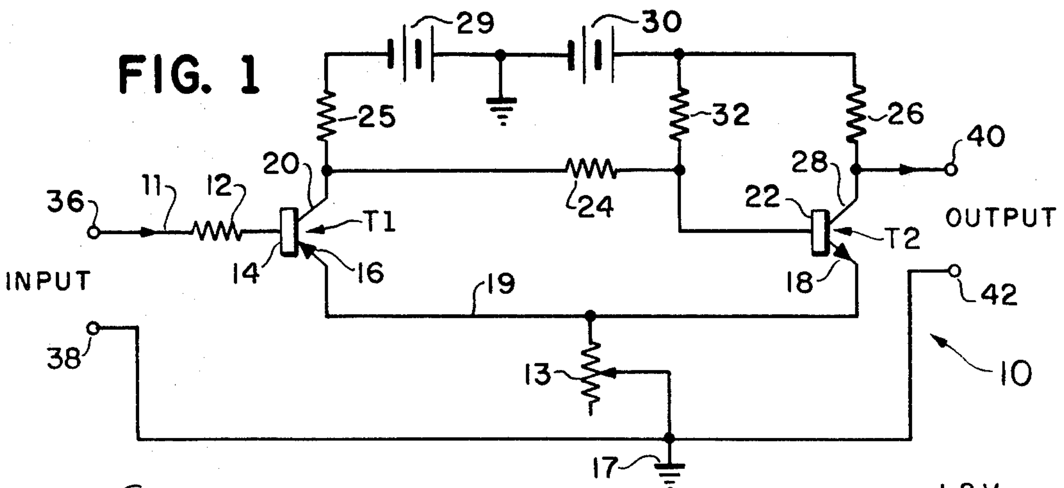

INVENTOR:
HANS H. NORD
BY J. B. Burke
ATTORNEY.

SCHMITT TRIGGER CIRCUIT WITH VARIABLE HYSTERESIS AND INSENSITIVITY TO TEMPERATURE CHANGE

This invention relates to nonlinear bistable electronic circuitry and more particularly to a transistorized Schmitt trigger circuit which displays features of unique advantage because of its novel structure.

The well-known Schmitt trigger circuit is a bistable regenerative circuit having two active control elements such as valve, transistors, or the like, and usually is so arranged that one of them is conducting at all times when the other one is not. One of the control elements is further provided with an input connection whereby an applied potential, if less than a predetermined value, will produce no effect, but if greater than said predetermined value will cause conduction to be shifted practically instantaneously to the alternate control element, with the consequent production of large and readily detectable voltage and current changes within its circuitry.

The described shift of conduction always occurs at the same nominal predetermined value of input voltage as the input voltage is gradually increased to that value. However, a shift of conduction will occur upon a gradual lowering of the input voltage than the predetermined value aforementioned. This difference in voltage through which the input voltage may range without tripping the trigger circuit at either extreme is termed the hysteresis voltage or potential, or the operating differential of the trigger circuit, and ranges from a few volts in a less sensitive device to a matter of millivolts in those circuits having control elements of high gain in circuitry with strong positive feedback. In any case the operating differential or hysteresis voltage has a fixed magnitude for any given circuit.

It is an object of this invention to provide a trigger circuit wherein the hysteresis voltage is readily adjustable in magnitude.

It is a further object of the invention to provide a trigger circuit wherein the hysteresis voltage is substantially balanced to ground.

It is still another object of the invention to provide a trigger circuit wherein an adjustment of the magnitude of the hysteresis voltage does not cause an offsetting or unbalance of the hysteresis voltage to ground.

Another object of the invention is to provide a trigger circuit as described wherein the quiescent current of the normally existing state is minimized by reason of both of the control elements then being in the off condition.

A still further object is to provide a trigger circuit as described wherein the number of components ancillary to the control elements is minimized.

Another object is to provide a trigger circuit as described wherein all of the components ancillary to the control elements comprise only that kind of circuit element having the greatest ruggedness, durability and reliability.

The invention briefly described in its presently preferred embodiment consists of a trigger circuit comprising a complementary pair of junction transistors connected together by a direct conductive path and also interconnected solely by resistive means to form a bistable circuit, and adjustable resistive means between the direct conductive path and common input-output terminal at ground, for adjusting the magnitude of hysteresis voltage of the trigger circuit without offsetting it from ground. When correctly constructed and provided with appropriate supply voltages, the circuit will be adjustable by means of the variable resistor to such a degree that the hysteresis voltage range can be reduced almost to zero, and the circuit will then act in a quasi-linear manner rather than in the binary or nonlinear manner normally associated with a Schmitt trigger.

Under these conditions the present circuit displays the extreme sensitivity characteristic of a trigger having minimal hysteresis while at the same time avoiding the instability problems normally associated with circuit arrangements which use a linear amplifier employing positive feedback in major amounts.

This mode of operation is highly advantageous for some purposes, since it provides a linear or proportional output of the kind needed for many control and measurement operations by the use of only a few relatively simple and inexpensive elements which in themselves need not be of linear quality, but may be of the less expensive switching variety, and in fact, operate more satisfactorily in the present circuit when of that type.

A further advantage of the above-described mode of operation is that the commonly employed compromise or trade-off of circuit gain in favor of circuit linearity, which ordinarily is accomplished by means of one or more feedback loops or circuits, is not necessary in the instant circuit, so that substantially the full gain potential of the components can be realized without the necessity of making any serious sacrifice of gain in the interest of linearity.

To those familiar with the schmitt trigger circuit, it will be evident that the switching points at which such a circuit of the conventional kind operates are not related in any useful way to ground potential, so that in most practical instances the fact that the circuit can be triggered by a small DC potential is not of any value, since the voltage level above ground at which such differential triggering potential must be provided is arbitrary, large, and usually inconvenient.

It also is well known that the stability of the operating points is seriously affected by changes in supply voltage, which renders the circuit unsuited to accurate measurement or detection purposes, unless a complicated and expensive stabilized or regulated power supply is provided to energize it.

A further feature of this invention which is of considerable value in some applications is the fact that under particular circumstances of circuit operation, the two transistors may both be arranged in cutoff condition at the same time in normal operation, so that very large savings in power consumption may be realized where available power is at a minimum or where the temperature increase resulting from heat produced by power dissipation is a serious disadvantage, or where the normal state persists almost to the exclusion of the triggered state (as in burglar alarm systems). The components which are nearly always in the cutoff condition may be made of smaller size and capacity, and hence less expensively, while still being capable of operating with unimpaired reliability.

The above-described characteristic of low power consumption resulting from an electrical circuit configuration of complementary symmetry and simultaneous cutoff of trigger transistors is shared by similar circuits in the art, notably that attributed to E. R. Keeler on page 106 of "Electronic Design" magazine of Mar. 16, 1964. In contrast to such circuits heretofore known, however, the circuit differences and component changes of the instant invention not only produce the novel and advantageous mode of operation previously described, but also cause the temperature stability of the triggering potentials to be substantially improved over all the other known circuit forms. This is attributable primarily to the fact that in the instant invention, the parameters of the semiconductors, which it is impossible to predict or to control with very much accuracy during their production, are not important determinants of the circuit triggering potentials. As a consequence of this, neither their initial values nor their well-known tendency toward violent changes in value in response to temperature variations are able to seriously affect the triggering potentials of the circuit. This result is in favorable contrast with the unpredictable performance of similar devices in the prior art.

As a further advantage, the triggering potentials of the circuit embodying the present invention can be held close to ground potential, an advantage which is unique, and which is especially desirable in simplifying the circuitry of comparison circuits, slideback voltmeters, and the like.

Figure 2:
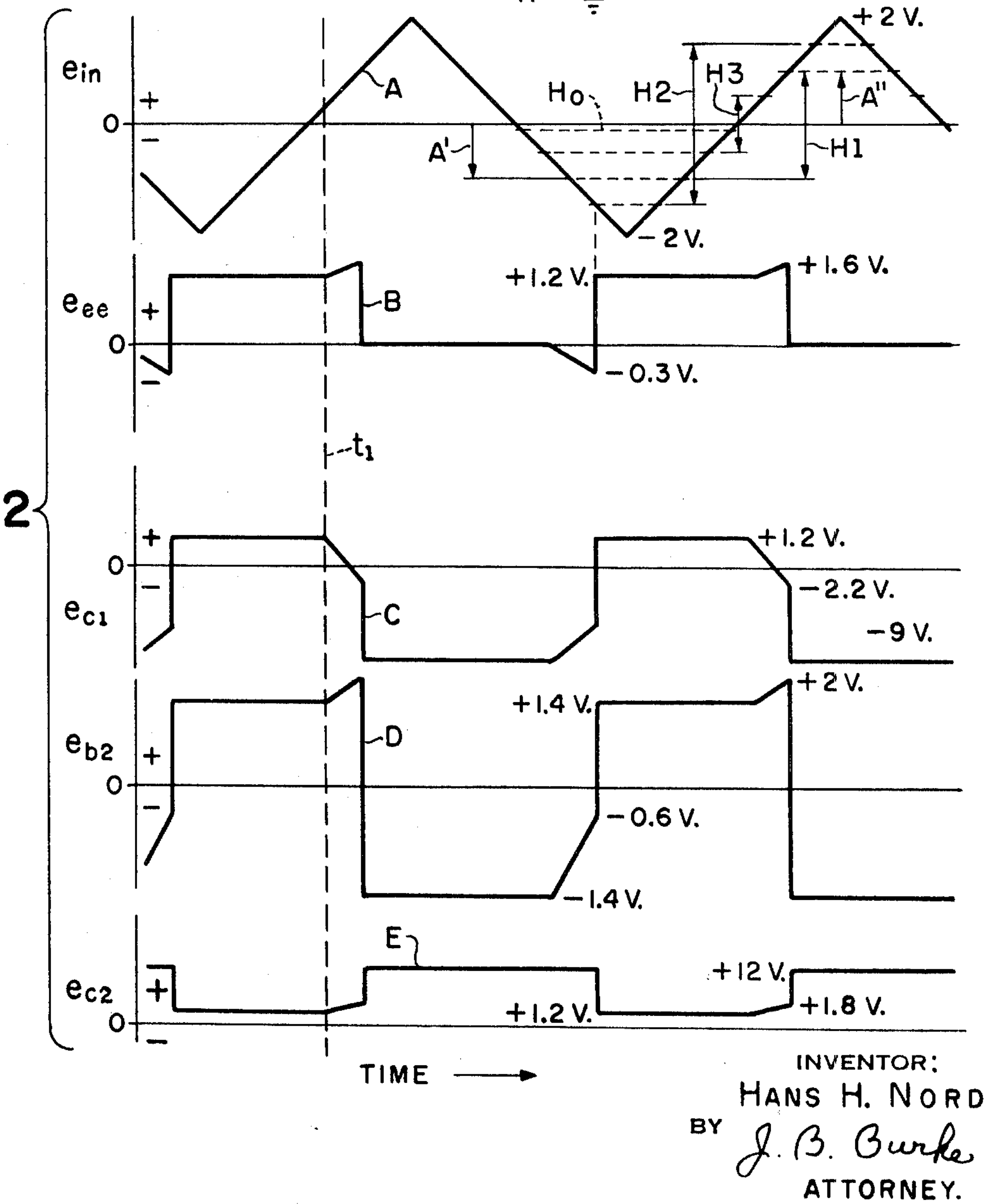

The objects of the invention and the advantages as set forth, as well as further objects and advantages will become apparent upon consideration of the following detailed description with particular reference to the drawing, wherein:

FIG. 1 is a schematic diagram of the electronic circuit comprising a preferred example of the invention; and FIG. 2 shows graphical diagrams used in explaining the invention, in which circuit voltages are plotted as functions of time.

Referring first to FIG. 1, electrical circuit 10 has an input conductor 11 which applies an input signal through an input resistor 12 to base 14 of a first transistor $T_1$. The input signal may be a DC voltage. Transistor $T_1$ is of the PNP type and is operated with emitter 16 connected to ground 17 through a variable resistor 13, as well as to emitter 18 of NPN type transistor $T_2$. The two emitters are connected directly together via common conductor 19. The collector 20 of transistor $T_1$ is connected to base 22 of transistor $T_2$ through the resistor 24. Appropriate power supply potentials are applied through current limiting resistors 25 and 26 to the collectors 20 and 28 of transistors $T_1$ and $T_2$ by the batteries 29 and 30 respectively. A voltage divider comprising resistors 24, 25 and 32 energized by the combined potentials of batteries 29 and 30 provides appropriate base bias voltage for transistor $T_2$.

In FIG. 2, waveform A shows input voltage $e_{in}$ which is applied to input terminals 36, 38 plotted against time. The input voltage is indicated as a sawtooth voltage which is balanced in positive and negative magnitude with respect to zero voltage. Waveform B indicates the voltage $e_{ee}$ of the common emitter circuit 19 with respect to ground 17. Waveform C indicates the voltage $e_{cl}$ of the collector 20 of transistor $T_1$. Waveform D indicates the voltage $e_{b2}$ at base 22 of transistor $T_2$. Waveform E indicates the voltage at collector 28 of transistor $T_2$ and also the output voltage at output terminals 40, 42.

In operation of circuit 10, a small positive signal applied to input terminals 36, 38 cuts off conduction of transistor $T_1$. The resistors 24, 25 and 32 are so selected that the base 22 of transistor $T_2$ connected thereto is then somewhat negative, and transistor $T_2$ is then cut off also. This condition is represented in FIG. 2, where the input signal designated $e_{in}$ is shown to be slightly positive at time $t_l$ on waveform A. The emitter voltage $e_{ee}$ of transistor $T_1$ is shown on waveform B to have a steady positive value at this time $t_1$. While a positive voltage $e_{in}$ is applied to the base of transistor $T_1$ both transistors are in nonconducting state. The positive input voltage cuts off transistor $T_1$ leaving a negative potential at the base of transistor $T_2$ which renders transistor $T_2$ nonconductive. This is shown by waveform D where base voltage $e_{b2}$ is negative while the input voltage $e_{in}$ is positive. When the input voltage $e_{in}$ starts to go negative as indicated in waveform A, the common emitter circuit follows as indicated by waveform B and transistor $T_1$ begins to conduct. This forces the collector of transistor $T_1$ to go positive as shown in waveform C. This positive potential at collector 20 together with the voltage divider 24, 32 forward biases transistor $T_2$ causing this transistor to conduct. As transistor $T_2$ begins to conduct, the common emitter circuit which has gone negative as indicated by waveform B due to the negative input potential, now goes positive which aids transistor $T_1$ into conduction and causes transistor $T_2$ to conduct further until it reaches its saturated state. This technique of having one transistor stage contribute to the conduction of another stage and vice versa is known as regenerative action.

In order to reverse the above operation and have both transistors nonconducting, input voltage $e_{in}$ must be driven positively. For transistor $T_1$ to cut off, input voltage $e_{in}$ must be of such magnitude that its base voltage approaches the emitter voltage. Wen the input voltage exceeds this value, transistor $T_1$ begins to cut off and its collector voltage $e_{cl}$ goes negative as shown by waveform C. As the collector of transistor $T_1$ proceeds negatively, a point is reached whereby the output of the voltage divider 24, 32 becomes negative and causes transistor $T_2$ to begin cutting off. With transistor $T_2$ going into nonconduction, its emitter goes negative causing transistor $T_1$ to cut off further which in turn cuts off transistor $T_2$. This is the same regenerative action which was present in the first case.

A previously mentioned, trigger circuit 10 is capable of controlling the hysteresis voltage. As is known in the art, the amount of hysteresis which a Schmitt trigger provides is regarded as the differences in voltage levels between the turning on and turning off points of the input voltage. Thus referring to waveform A of FIG. 2, the hysteresis here would be the difference between level A′ and level A″. As the resistance of variable resistor 13 is increased level A″ will be greater in order to overcome the increased emitter voltage and level A′ will decrease. It should be noted that the only controlling factor for hysteresis is resistor 13. This method of control is such that it provides a symmetrical change in the switching levels for various resistance changes of resistor 13. By way of example it is noted from waveform A that the hysteresis for various resistance values of resistor 13 has an average switching level of −0.1 volt. Thus from hysteresis condition H1 (A′+A″), if the resistance of resistor 13 is increased, hysteresis condition H2 occurs, and if the resistance of resistor 13 is decreased hysteresis condition H3 will result. It should be noted that when the positive level (off point) is increased, the negative level (on point) decreases and vice versa. Zero hysteresis occurs at condition H0. Here there is a difference of zero between the on and off switching point and the circuit ceases to function as a Schmitt trigger.

Once again the controllability of the hysteresis should be emphasized due to its symmetrical varying quality which enables the circuit to trigger at various levels and also provides for zero hysteresis. All this is accomplished with a single resistor in the common emitter circuit, making for a stable operation, since any change in this resistor produces a small DC shift in the input of the first stage leaving its operating point relatively the same.

Also noteworthy is the fact that any change in temperature does not appreciably affect the operating point of the trigger. This is due to the fact that of the changes in the base emitter voltage drops of transistors $T_1$ and $T_2$ with temperature, only the base-emitter voltage change of transistor $T_1$ is significant, since the base-emitter voltage change of transistor $T_2$ is overshadowed by the large gain in the first stage. Although the base-emitter voltage drops in the two transistors are similar, the effect of the gain in the first stage provides enough drive to the second stage to make its base-emitter voltage drop insignificant.

In contrast to the present circuit, the prior Keeler trigger circuit above mentioned relies heavily on the characteristics of the transistors to determine the amount of hysteresis. Also noteworthy is the fact that temperature changes affect the operating points of both transistor stages in the Keeler circuit. The switching voltage depends on the common emitter voltage, which is determined by the leakage current of the transistors in their nonconductive state. This design is highly susceptible to temperature changes, since the leakage current of transistors vary greatly with temperature. Another factor which makes this circuit unreliable is that any temperature change affects both operating points equally due to the common emitter design and can cause the circuit to lose its regenerative action.

The present invention by contrast, exhibits a much more stable operation than the Keeler trigger circuit. It has positive hysteresis control and is substantially insensitive to temperature change of its transistors.

It is possible to interchange the transistors by substituting NPN and PNP transistors respectively for transistors $T_1$, $T_2$, and by making appropriate reconnections of the batteries 29, 30.

What I claim is:

1. A bistable regenerative trigger circuit comprising:

a. first and second transistors each having a base, emitter and collector, said transistors being complementary connected with their emitters coupled wherein one of said transistors is of the PNP type and the other is of the NPN type;

b. a variable resistor connected between said emitters and ground;

c. input signal means connected to an input circuit including in series the base and emitter of said first transistor said variable resistor and ground;
d. DC power supply means for applying DC power to the collectors of said transistors;
e. first resistive means coupled with said power supply means and with the collector of said first transistor for limiting the current to said collector;
f. second resistive means coupled with said power supply means and with the collector of said second transistor for limiting the current to said second transistor collector; and
g. voltage bias means including a resistive voltage divider circuit coupled with said resistive means (e) and (f) and with said power supply means for applying a bias voltage to the base of said second transistor of a magnitude to render said first and second transistors regeneratively nonconductive when the voltage of an input signal applied to said input means is at a first predetermined positive level and rendering said first and second transistors regeneratively conductive when said input signal is at a second predetermined negative level; whereby the difference between said first and second predetermined voltage levels is rendered dependent upon the resistance setting of said variable resistors (b).

2. A trigger circuit as defined by claim 1, wherein said power supply means (d) together with said first and second resistive means (e) and (f) comprise; a first DC voltage source and a first current limiting resistor connected between ground and the collector of the first transistor, and a second DC voltage source and second current limiting resistor connected between ground and the collector of the second transistor; and wherein said voltage divider circuit of (g) comprises a voltage divider including third and fourth resistors connected together at one end to the base of the second transistor, the other end of the third resistor being connected to the first DC voltage source via the first current limiting resistor, the other end of the fourth resistor being connected directly to the second DC voltage source.

3. A trigger circuit as defined by claim 2, wherein said input signal means (c) comprises a signal input terminal, and a fifth current limiting resistor connected between said signal input terminal and the base of the first transistor.